June 29, 1948.   LE ROY T. MILLER   2,444,058
CONNECTOR DEVICE
Filed May 14, 1946

Inventor
Le Roy T. Miller
By
Lyon+Lyon
Attorneys

Patented June 29, 1948

2,444,058

UNITED STATES PATENT OFFICE 2,444,058

CONNECTOR DEVICE

Le Roy T. Miller, Burbank, Calif.

Application May 14, 1946, Serial No. 669,628

2 Claims. (Cl. 238—260)

This invention relates to a connector device and is particularly useful in joining together rolled sections in end-to-end relationship. This invention finds particular usefulness as embodied in a rail joint in connecting the ends of railroad rails in operative position.

The principal object of this invention is to provide a novel connection device of this type which will provide a joint having no initial looseness and which will maintain initial tightness under vibration and repeated stresses in order that looseness and consequent wear may not develop.

Another object is to provide a rail joint having transverse connection elements of novel design.

A further object is to provide a rail joint having transverse fasteners between the splice plates having conical sleeves split along one side, adapted to provide a rigid connection between the splice plates and the fasteners.

Another object is to provide a rail joint in which stationary means are provided between the splice plates for the purpose of maintaining the splice plates against deflection or looseness.

Other objects and advantages will appear hereinafter.

Figure 1:
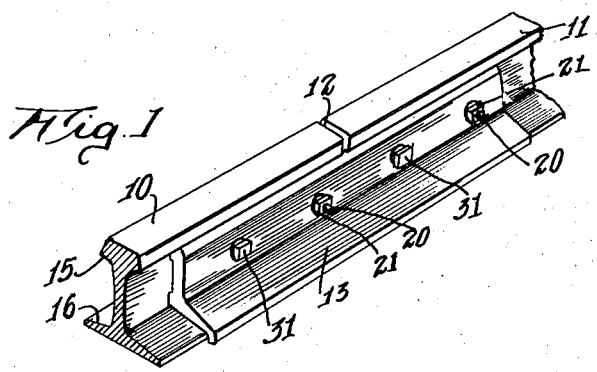
Figure 1 is a perspective view of a rail joint embodying my invention.

Referring to the drawings, the rail joint shown in Figure 1 illustrates a preferred embodiment of this invention, but it is to be understood that the broader aspects of the invention apply equally well to apparatus for joining any rolled, extruded or formed sections, such as I-beams, channels, etc.

Figure 2:
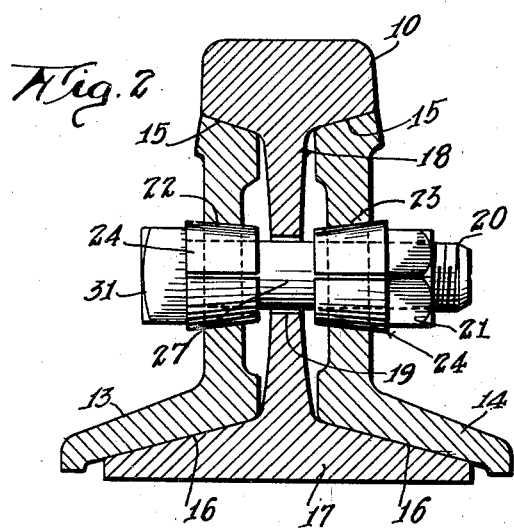
Figure 2 is a transverse sectional view taken on a plane normal to the rail axis and passing through one of the bolts shown in Figure 1.
Figure 3:
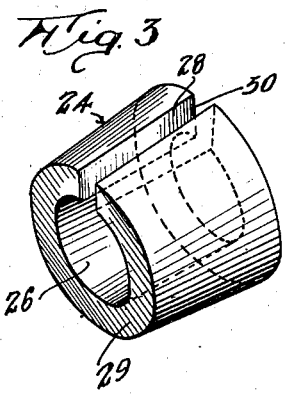
Figure 3 is a perspective view illustrating details of one of the split sleeves employed in connection with this embodiment of my invention.

The embodiments shown in Figures 1 and 2 include rail ends 10 and 11 meeting in end-to-end relationship at the juncture 12 and are shaped to provide with the under surfaces 15 of the railhead 10 and the tapered surface 16 on the rail flange 17.

The web 18, connecting the railhead 10 and the rail flange 17, is provided with a plurality of slots 19 extending longitudinally of the rail. Extending transversely through each of these slots 19 is a tension bolt 20 having a nut 21 threaded thereon. Tapered apertures 22 and 23 are provided in the splice plates 13 and 14 in alignment with the rail slots 19.

A one-piece split tapered sleeve 24 is adapted to be received within each of the tapered apertures 22 and 23. The sleeves 24 are provided with a frusto-conical outer surface adapted to mate with the tapered apertures 22 and 23 and a central cylindrical bore 26 adapted to closely fit the cylindrical shank 27 on the bolt 20. The sleeves 24 are provided with a single slot 28 extending longitudinally between the parallel ends 29 and 30.

From this description, it will be understood that upon threading the nut 21 upon the bolt 20, the sleeves 24 are confined between the nut 21 and the bolthead 31 and, therefore, upon continued threading of the nut relative to the bolt, the sleeves 24 are seated under compression within the apertures 22 and 23. This action serves to set up compressive stresses in the sleeves 24 and hence causes them to reduce slightly in diameter, thereby gripping the shank 27 of the bolt in rigid engagement. The bolt 20, nut 21 and sleeves 24, therefore, cooperate with the tapered apertures 22 and 23 to provide a transverse stiffening element adapted to resist independent bending and twisting motion of either of the splice plates 13 or 14.

Figure 4:
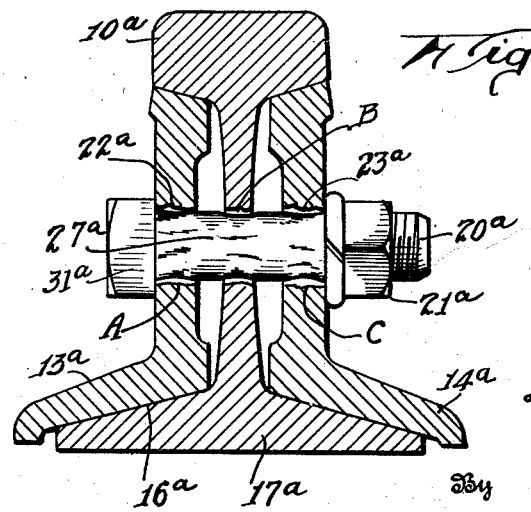
Figure 4 is a transverse sectional view through a conventional form of a rail joint showing the effects of looseness and wear which develop after a period of use. It will be noted that wear on the bolt is confined to the regions of contact with the rail and with the splice plates.

The advantages of the transverse stiffener construction just described are emphasized by comparison with a conventional rail joint construction illustrated in Figure 4. In the latter arrangement the splice plates 13[a] and 14[a] are initially maintained in assembled relation with respect to the railhead 10[a] and rail flange 17[a] by the tension bolt 20[a] and nut 21[a]. In this conventional arrangement the apertures 22[a] and 23[a] in the splice plates are approximately cylindrical but do not fit with any degree of accuracy on the cylindrical shank 27[a] of the bolt 20[a]. The result is that after a period of service looseness, which is present between the shank 27[a] of the bolt and the apertures 22[a] and 23[a], permits relative twisting, bending and deflections between the splice plates 13[a] and 14[a]. Locomotives now in service may weigh as much as four hundred tons and the deflections in the rail and splice plates, when the assembly is subjected to extremely heavy rolling loads of this character, eventually result in objectional wear at the locations labeled A, B, and C as shown in Figure 4, Examination of rail joint tension bolts of conventional form after a period of use has shown that wear at these locations becomes progressively and increasingly more pronounced over a period of time. Eventually the wear develops clearances of such an extent that the splice plates 13a and 14a are no longer maintained in pressure contact with the railhead 10a and rail flange 17a. After the wear has reached this stage, the rail joint must be replaced since the rail ends are no longer adequately supported.

Referring again to the improved rail joint embodying my invention, it will be apparent that the tapered apertures 22 and 23 and the cooperating tapered split sleeves 24 provide a more rigid connection between the splice plates 13 and 14, in effect, constitute a rigid stiffener joining the splice plates and requiring them to deflect under load as a unit. Periodic tightening by the track maintenance crew serves to maintain the compression stresses in the splice plates adjacent to the apertures, in the sleeves 24, and in the shank 27 of the bolt 20, thereby effectively preventing looseness and consequent wear.

Having fully described my invention, it is to be understood that I do not wish to be limited to the details herein set forth, but my invention is of the full scope of the appended claims.

I claim:

1. Apparatus for connecting elongated rail members end-to-end comprising in combination a pair of side elements positioned substantially parallel with said rail members in lateral contact therewith and extending across the junction at the adjacent ends of the rail members, plural means for clamping each of the rail members between the side elements, each of said means including aligned tapered apertures formed in the sile elements, a tension bolt provided with a shank a head and a threaded portion extending transversely through an opening in the elongated rail member and through said tapered apertures, a one-piece split tapered sleeve received within each tapered aperture and provided with a bore closely fitting the shank of the tension bolt with at least a portion of each sleeve surrounding the shank of the bolt, and a nut threaded on the bolt adapted to seat the split tapered sleeves in the tapered apertures under compression between it and the bolt head and thereby grip the shank of the bolt, whereby the side elements are rigidly held against relative deflection.

2. In a device for connecting end-to-end elongated rail members having a cross section defined by spaced transverse portions connected by a relatively thin web section, the combination of a pair of side elements positioned substantially parallel with said rail members and in contact with said transverse portions of the rail members, said side elements extending across the junction at the adjacent ends of the members, plural means for clamping each of the rail members between the side elements, each of said means including aligned tapered apertures formed in the side elements, a tension bolt provided with a cylindrical shank a head and a threaded portion extending transversely through an opening in the elongated member and through said tapered apertures, a one-piece split tapered sleeve received within each tapered aperture and provided with a cylindrical bore closely fitting the shank of the tension bolt with at least a portion of each sleeve surrounding the shank of the bolt, a nut threaded on the bolt adapted to seat the split tapered sleeves under compression to grip the shank between it and the bolt head, the tension bolt, split sleeves and nut cooperating to provide a unitary stiffener member adapted to resist relative deflection of the side elements.

LE ROY T. MILLER.

REFERENCES CITED

The following references are of record in the file of this patent:

UNITED STATES PATENTS

| Number | Name | Date |
|---|---|---|
| 1,199,743 | Gadd | Sept. 26, 1916 |
| 1,257,708 | Hyle et al. | Feb. 26, 1918 |
| 2,607,273 | Hecht | Nov. 16, 1926 |